US011507444B1

(12) United States Patent
Hamlin et al.

(10) Patent No.: US 11,507,444 B1
(45) Date of Patent: Nov. 22, 2022

(54) PLATFORM FRAMEWORK ERROR HANDLING

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 8 days.

(21) Appl. No.: 17/355,366

(22) Filed: Jun. 23, 2021

(51) Int. Cl.
| | |
|---|---|
| *G06F 11/07* | (2006.01) |
| *G06F 11/10* | (2006.01) |
| *G06F 11/14* | (2006.01) |
| *G06T 1/20* | (2006.01) |
| *G06F 9/54* | (2006.01) |

(52) U.S. Cl.
CPC ............ *G06F 11/0736* (2013.01); *G06F 9/54* (2013.01); *G06F 11/1016* (2013.01); *G06F 11/142* (2013.01); *G06F 11/1438* (2013.01); *G06F 11/1441* (2013.01); *G06T 1/20* (2013.01)

(58) Field of Classification Search
CPC .... G06F 11/0736; G06F 9/54; G06F 11/1016; G06F 11/142; G06F 11/1438; G06F 11/1441; G06T 1/20
See application file for complete search history.

(56) References Cited

U.S. PATENT DOCUMENTS

| | | | |
|---|---|---|---|
| 2006/0143515 A1* | 6/2006 | Kuramkote | G06F 11/0793 714/15 |
| 2020/0252451 A1* | 8/2020 | Nandavar | H04L 41/40 |

* cited by examiner

*Primary Examiner* — Matthew M Kim
*Assistant Examiner* — Kyle Emanuele
(74) *Attorney, Agent, or Firm* — Fogarty LLP (57) ABSTRACT

Embodiments of systems and methods for platform framework error handling are described. A platform framework may receive registration requests from framework participants that provide operation of a plurality of hardware devices of an IHS (Information Handling System). The framework registration requests by participants specify remediation policies for addressing error conditions related to respective participants. The received remediation policies are mapped to the registered participants, where remediation policies may include handles for invoking remediation procedures for a registered participant. Error conditions are detected during operation of the platform framework. The registered participant is identified as a source of the error condition and a remediation policy that is mapped to the registered participant is identified. Handles in the remediation policy are used to invoke remediation procedures for the registered participant. Remediation procedures invoked by the handles may be provided by a remediation agent that provides support for registered participants.

20 Claims, 4 Drawing Sheets

PLATFORM FRAMEWORK ERROR HANDLING

FIELD

The present disclosure relates generally to Information Handling Systems (IHSs), and more particularly, to systems and methods for supporting the use of various internal components of IHSs.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework error handling are described. In an illustrative, non-limiting embodiment, an Information Handling System (IHS) may include a plurality of hardware devices, each operated by one or more registered participants of a platform framework. IHS embodiments may further include a processor and a memory coupled to the processor, the memory having program instructions stored thereon that, upon execution, cause the platform framework to: receive a registration request from a registered participant providing operation of a first of the plurality of hardware devices, wherein the request specifies a remediation policy for addressing error conditions related to the registered participant; map the remediation policy to the participant, wherein the remediation policy comprises one or more handles for invoking remediation procedures for the registered participant; detect an error condition during operation of the platform framework; determine the registered participant is a source of the error condition; determine the remediation policy that has been mapped to the registered participant; and utilize the one or more handles in the remediation policy to invoke remediation procedures for the registered participant.

In additional IHS embodiments, the handle comprises a communication resource supported by a remediation agent that provides support for the registered participant. In additional IHS embodiments, the handle comprises an IPC (Inter-process Communication) supported by an operating system of the IHS. In additional IHS embodiments, the handle comprises an IPC supported by an embedded controller of the IHS. In additional IHS embodiments, the registered participant comprises a containerized workspace and wherein the remediation agent comprises a remote workspace orchestrator that directs deployment of the workspace on the IHS. In additional IHS embodiments, the remediation policy is comprised in a workspace definition by which the workspace orchestrator directs the deployment of the workspace on the IHS. In additional IHS embodiments, the utilization of the handles comprises invoking procedures to restart the registered participant through use of a remediation API supported by the remediation agent. In additional IHS embodiments, the remediation policy comprises one or more fail-over procedures for adapting operations by the platform framework while the registered participant is unavailable. In additional IHS embodiments, the registered participant supports use of a camera of the IHS, and wherein the remediation procedures comprise a command for initiating re-initialization of the camera by the remediation agent. In additional IHS embodiments, the remediation procedures further comprise instructions for use of an alternative image collection capability that is supported by the platform framework while the camera is unavailable. In additional IHS embodiments, the registered participant supports use of a network controller of the IHS, and wherein the remediation procedures comprise instructions for use of an alternative network resource that is supported by the platform framework while the network controller is unavailable. In additional IHS embodiments, the registered participant supports use of a graphics controller of the IHS, and wherein the remediation procedures comprise instructions for initiating a reset of the graphics controller. In additional IHS embodiments, the registered participant supports use of a graphics controller of the IHS, and wherein the remediation procedures comprise instructions for reverting settings in use by the graphics controller. In additional IHS embodiments, the error condition comprises a report of conflicting requests received by the registered participant. In additional IHS embodiments, the remediation policy comprises instructions for updating a remediation API that is supported by the remediation agent. In additional IHS embodiments, the registered participant provides user presence detection capabilities, and wherein the remediation procedures comprise instructions for use of an alternative sensor when the error condition indicates a primary sensor is unavailable.

In various additional embodiments, memory storage devices include program instructions stored thereon that, upon execution by an Information Handling System (IHS) comprising a plurality of hardware devices, each operated by one or more registered participants of a platform framework, cause the IHS to: receive a registration request from a registered participant providing operation of a first of the plurality of hardware devices, wherein the request specifies a remediation policy for addressing error conditions related to the participant; map the remediation policy to the registered participant, wherein the remediation policy comprises one or more handles for invoking remediation procedures for the registered participant; detect an error condition during operation of the platform framework determine the registered participant is a source of the error condition; identify a remediation policy that is mapped to the registered participant; and utilize the one or more handles in the remediation policy to invoke remediation procedures for the registered participant. In additional memory storage device embodiments, the handle comprises a communication resource supported by a remediation agent that provides support for the registered participant.

In various additional embodiments, methods may include: receiving a registration request from a participant of a platform framework, wherein the participant provides operation of a first of a plurality of hardware devices of an IHS (Information Handling System), and wherein the request specifies a remediation policy for addressing error conditions related to the participant; mapping the remediation policy to the registered participant, wherein the remediation policy comprises one or more handles for invoking remediation procedures for the registered participant; detecting an error condition during operation of the platform framework; determining the registered participant is a source of the error condition; identifying a remediation policy that is mapped to the registered participant; and utilizing the one or more handles in the remediation policy to invoke remediation procedures for the registered participant. In additional method embodiments, the handle comprises a communication resource supported by a remediation agent that provides support for the registered participants.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
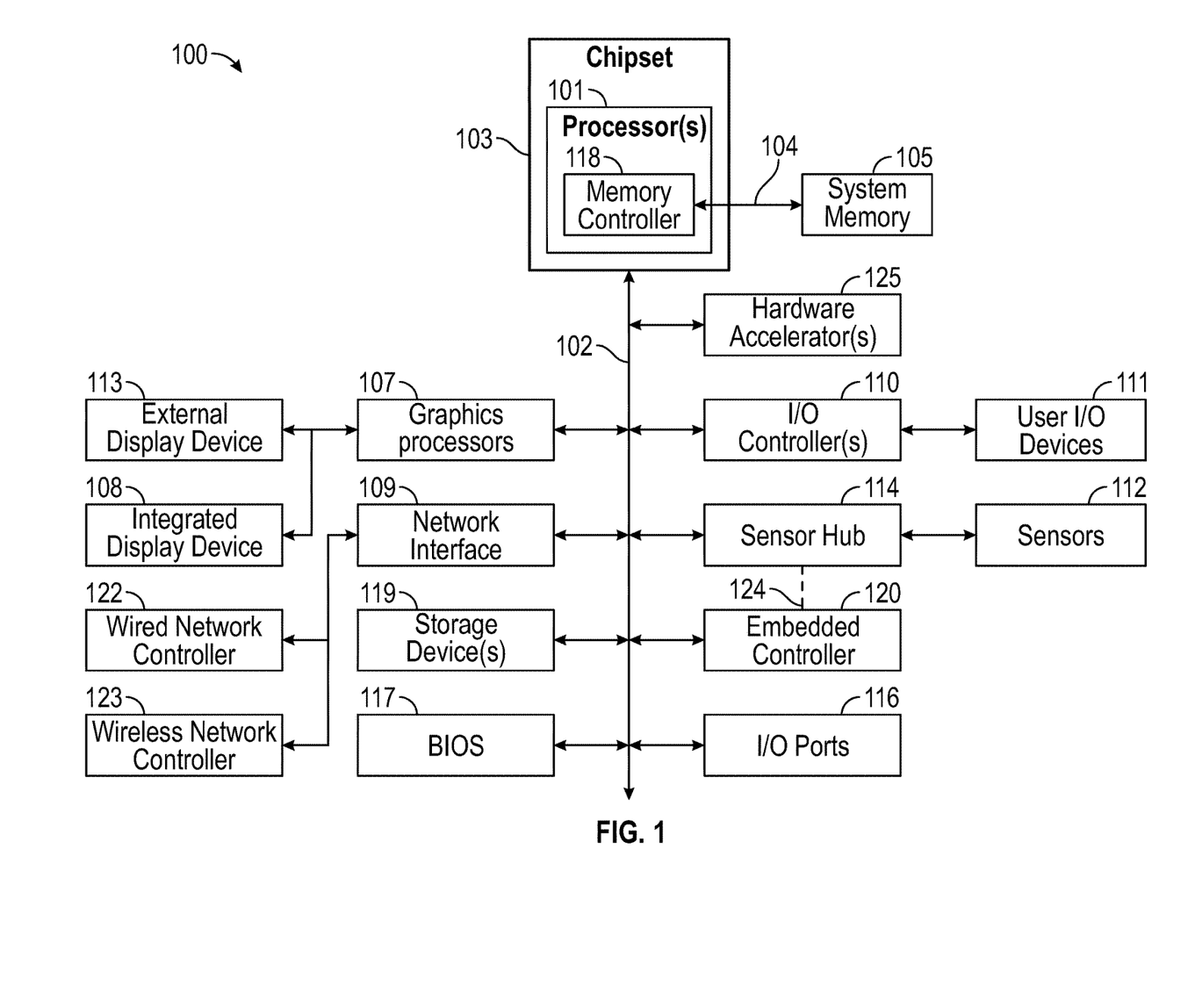
FIG. 1 is a block diagram of an example of hardware components of an Information Handling System (IHS) configured to support platform framework error handling, according to some embodiments.

FIG. 1 is a block diagram illustrating components of IHS 100 configured to support platform framework error handling according to some embodiments. As shown, IHS 100 includes one or more processor(s) 101, such as a Central Processing Unit (CPU), that execute code retrieved from system memory 105. Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor (ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102. In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit (VC) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
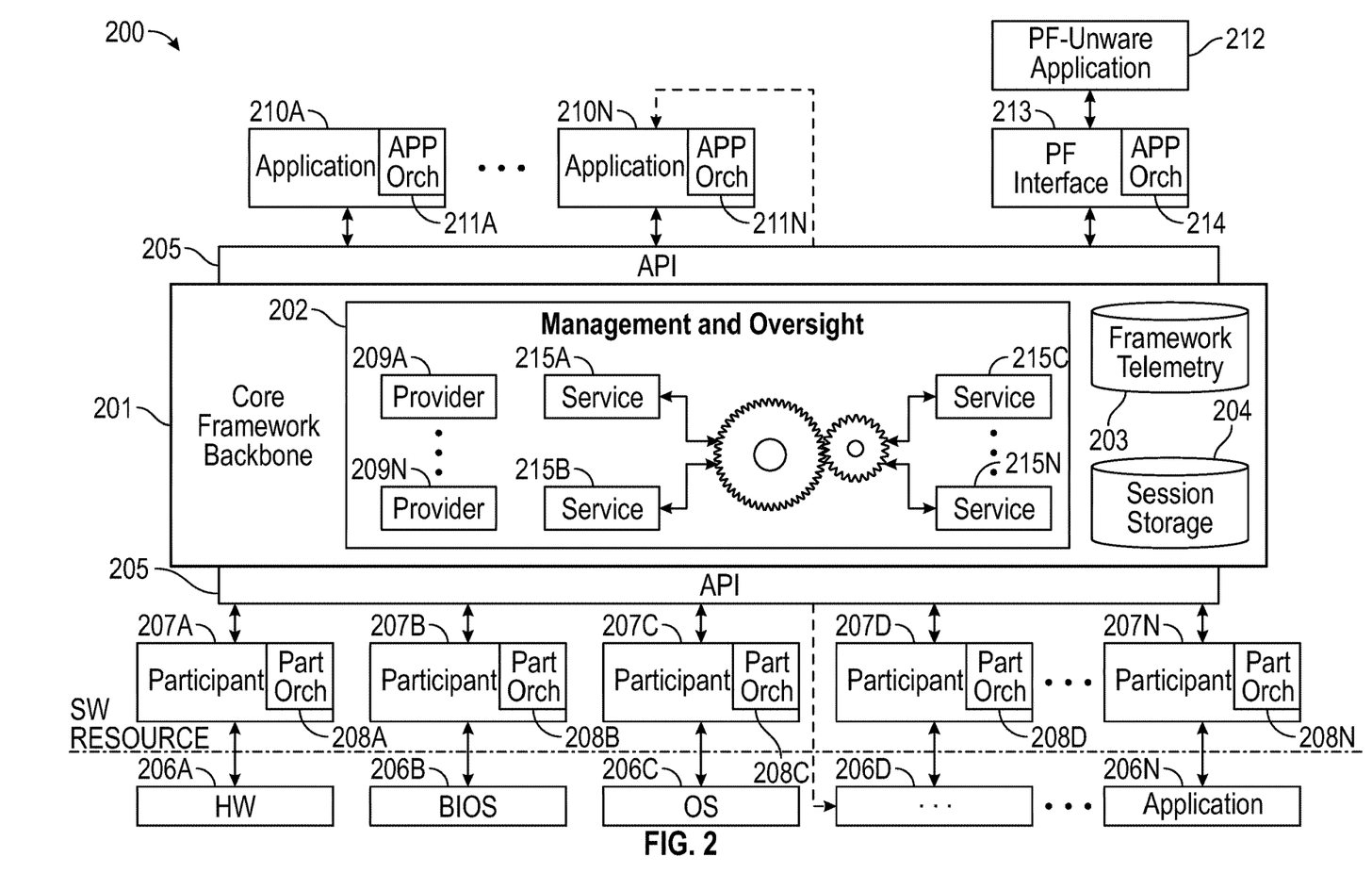
FIG. 2 is a block diagram illustrating an example of a platform framework deployed in an IHS in a manner that supports error handling for framework participants, according to some embodiments.

FIG. 2 is a block diagram illustrating an example of platform framework 200. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.). In some implementations, platform framework 200 may be supported by and/or executed within an OS used by IHS 100, and it may be scaled across user and kernel spaces. Additionally, or alternatively, platform framework 200 may be provided as a software library or an ".exe" file. As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process. In some instances, the platform framework 200 may provide a handle received from a participant to other validated participants, thus supporting the ability for various types of participants to communicate directly with each other. For example, a handle provided to the platform framework 200 may include a reference to an IPC (Inter-Process Communications) resource of the IHS that is to be used in API communications supported by the participant providing the handle.

In various embodiments, platform framework 200 may include at least three different types of participants: producers, consumers, and providers. Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions. On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one or more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services. For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an I2C sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100. For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform networks may communicate with each other via an Interprocess Communication (IPC) resource specified in a handle provided by the workspace orchestration service for communications with the workspace(s) involved.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be complied, whereas the polic(ies) that the code enforces may change at runtime (e.g., by a user's command in real time) and therefore may be considered "runtime objects."

Figure 3:
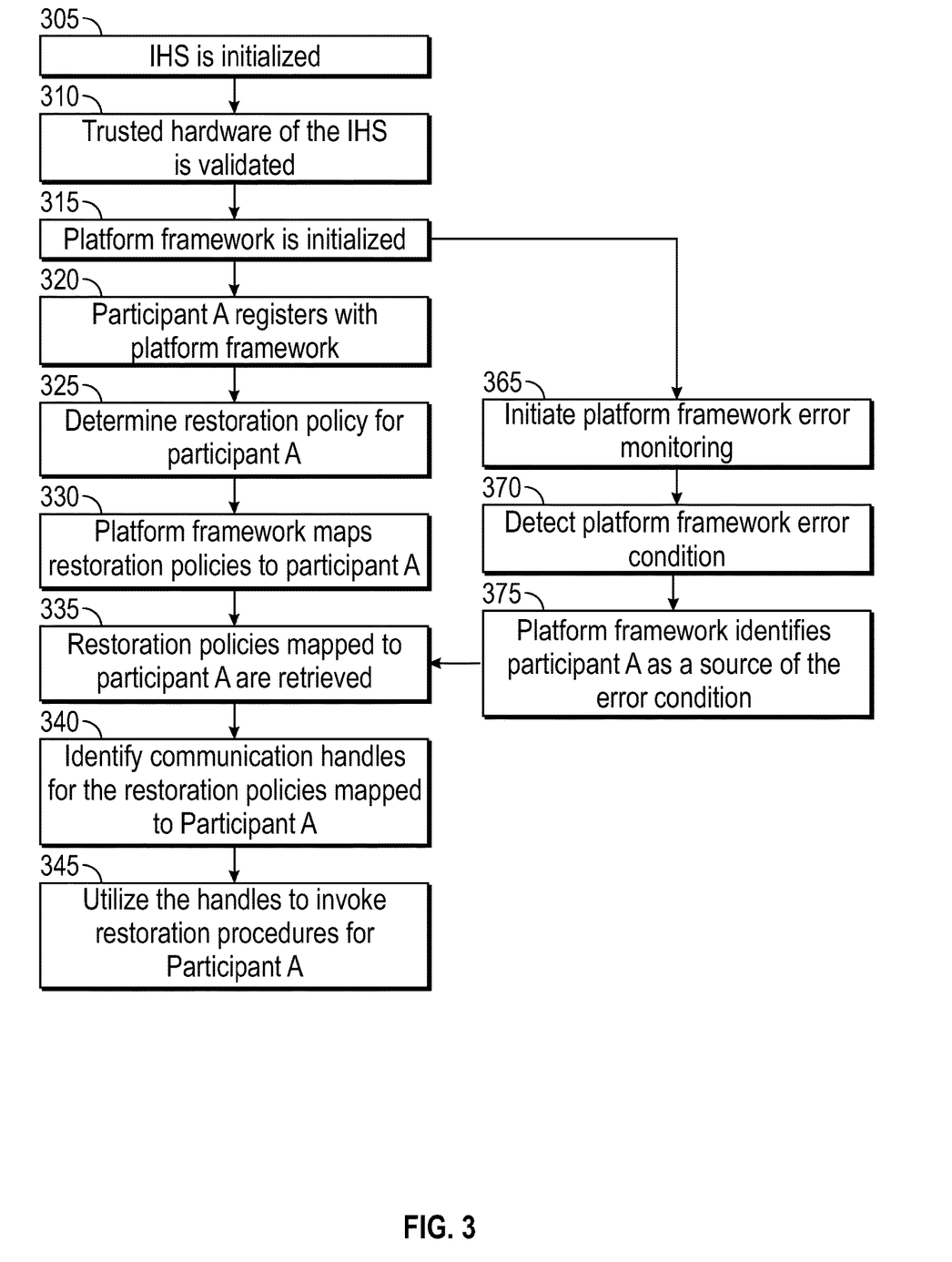
FIG. 3 is a flowchart illustrating an example of a method for supporting platform framework error handling, according to some embodiments.

FIG. 3 is a flowchart illustrating an example of a method for supporting platform framework error handling, according to some embodiments. Some embodiments may begin at block 305 with the initialization of an IHS, such as described with regard to FIG. 1. In some embodiments, procedures for initializing an IHS may include validation of various hardware components of the IHS, such as by the embedded controller of the IHS of FIG. 1. Accordingly, at block 310, the firmware instructions utilized by various hardware components may be validated against reference signatures for each respective component, thus confirming the hardware component is operating utilizing trusted instructions and is thus a trusted hardware component. Upon validating these hardware components such that they are included within a root of trust, an operating system of the IHS may be booted. With the operating system booted, at block 315, a platform framework for the IHS is initialized, where the platform framework provides a single interface for accessing various resources of the IHS, such as described with regard to FIG. 2.

Once the platform framework is initialized, it may be utilized by platform framework participants to access various resources of the IHS platform. For instance, various settings and status information may be obtained for a platform resource such as a camera of the IHS, where such camera information is made available to platform framework participants by a producer that has registered with the platform framework in providing access to camera resources. In some instances, the producer may also provide capabilities for operating a platform resource, such as the ability to operate the camera of the IHS to capture images and/or video. Various types of error conditions may occur in the use of such a camera resource. For instance, a camera may generate an error indicating a failure to capture an image due to the closing of a shutter, or due to loss of connectivity with an external camera. A camera may also generate errors indicating the device is in an error condition that has rendered it inoperable, such as inadvertent loading of an inoperable driver for operating the camera. A camera may also issue error notifications that signal that image capture capabilities are presently compromised, such as due to poor lighting. With many different platform framework resources generating error messages, ad hoc systems for error handling are prone to being ineffective due to the patchwork of error handling capabilities that exist within an IHS. Errors will typically be generated, collected and propagated by various different platform framework participant, thus compounding the difficulty in effective use of error handling capabilities.

Embodiments provide capabilities by which a central error handling system of a platform framework may be utilized to initiate remediation procedures for addressing errors identified in the operation of the platform framework. Such remediation procedures that are initiated by embodiments may be specified in remediation policies that may include instructions for error recovery. In the above example where a platform framework is a camera that may issues various types of errors, the remediation policy provided by a framework participant may include instructions for initiating fail-over procedures that limit the impact of the error on the operations being supported by the platform framework, such as immediately resetting the camera and/or switching to an alternate image collection capability of the platform framework.

Figure 4:
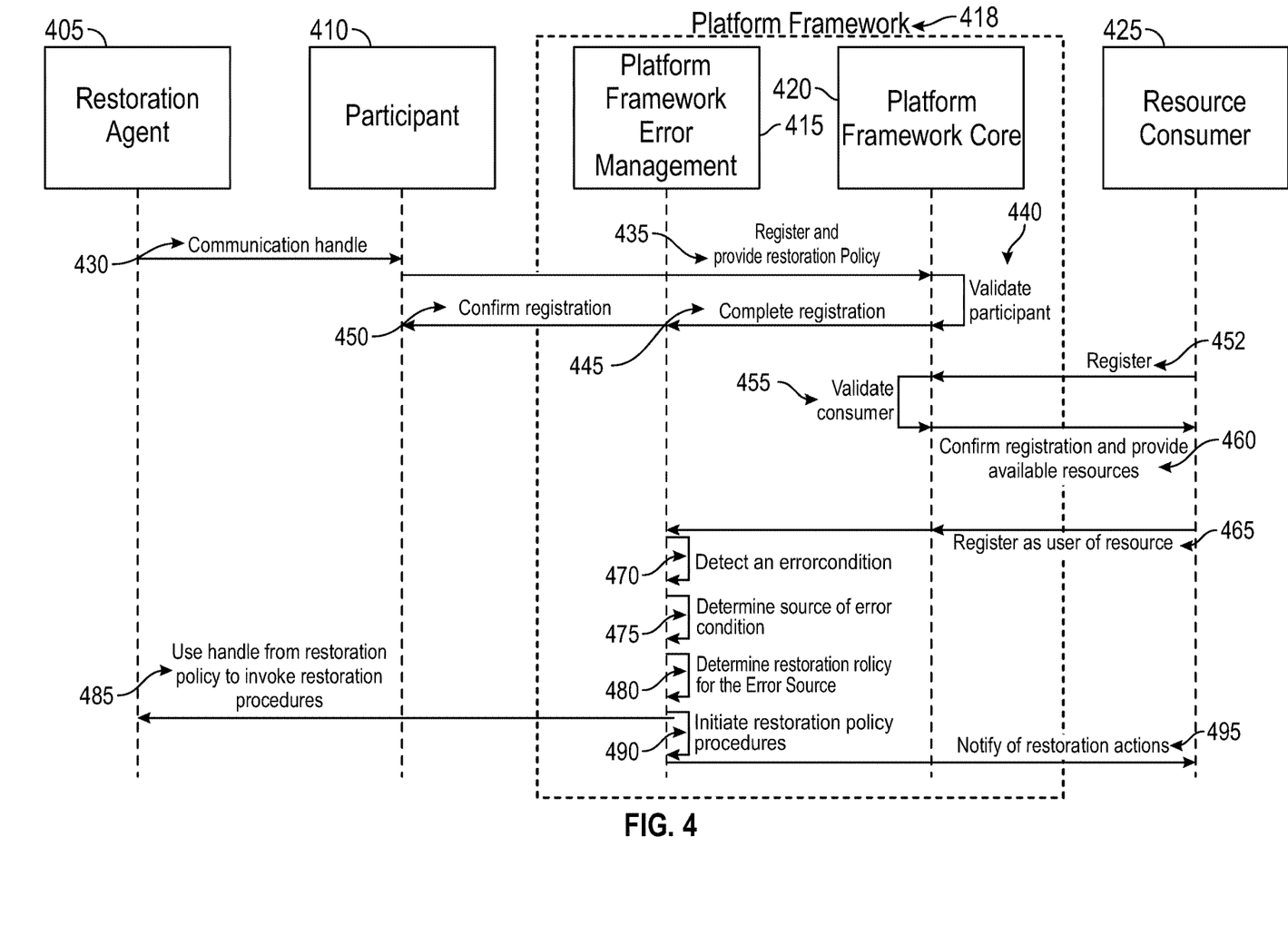
FIG. 4 is a message diagram illustrating certain operations of components of an IHS that are configured to support platform framework error handling, according to some embodiments.

Various types of participants that provide access to a platform framework resource may make platforms resources available to other participants through the providing participant's registration with the platform framework. Such registrations by participants are illustrated in FIG. 4, which is a message diagram illustrating certain operations of components of an IHS that are configured to support platform framework communications, according to some embodiments. In various embodiments, a participant 410 may provide use of variety of platform framework resources, such as providing use of the camera in the above example or providing use of an individual component (e.g., time-of-flight sensor, motion sensors, thermal sensor, GPS sensor, etc.), a sub-system of the IHS (e.g., a graphics controller, a network controller, an embedded controller, a display) or various other hardware resources of an IHS. In various embodiments, a participant 410 may provide use of platform framework resources that itself relies on several different platform framework resources. For instance, a participant 410 providing user presence detection services may rely on platform framework data streams provided by a variety of sensors and other components of an IHS.

Such participants 410 may be initialized and may receive, query or generate a remediation policy, where the remediation policy of a respective participant provides instructions for addressing error conditions related to that particular participant 410. As described in additional detail below, a remediation policy may specify remediation procedures for responding to different types of detected error conditions. In some instances, remediation procedures set forth in a participant's 410 remediation policy may be initiated by the platform framework itself, such as remediation procedures that direct fail-over procedures by the platform framework. For example, the remediation policy of the camera in the above example may provide instructions for use of an alternate image collection capability of the IHS, such as an external camera or such as a motion sensor, that may be utilized to provide at least imaging capabilities, even if significantly degraded, in scenarios where the camera becomes inoperable, or is otherwise unavailable. In embodiments where the participant 410 provides use of a network controller, the remediation policy provided by the participant 410 may specify alternate networking capabilities that may be utilized in scenarios where the network controller is unavailable. For instance, the remediation policy of a participant 410 providing access to a Wi-Fi controller may specify use of a Bluetooth controller, a cellular controller, a mesh network controller or other networking capability when the Wi-Fi controller is unavailable. In other instances, a fail-over procedure specified in a participant's 410 remediation policy may specify other types of adaptations to be implemented in response to a detected error condition. In some embodiments, a remediation policy for a participant 410 providing use of a camera may specify instructions for reverting to audio-only operations, such as by converting an ongoing video conference session to an audio conference session. In some embodiments, a remediation policy may specify remediation procedures that may be invoked, such as requesting a restart or other reinitialization of a participant 410 and/or of a component that is accessed by a participant 410, such as invoking a restart of a camera, audio controller, graphics controller or sensor that is accessed by the participant.

These various types of remediation procedures that may be invoked may include remediation operations by a variety of components other than the platform framework, including operations by a remediation agent 405 that provides support for a participant 410. For example, in embodiments where a participant 410 provides support for audio capabilities of an IHS, a remediation procedure may invoke a restart of the audio controller of an IHS by the operating system of the IHS, or by an embedded controller of the IHS that provides out-of-band management of various hardware components of the IHS. In embodiments where a participant 410 provides use of a graphics controller of the IHS, a remediation policy for the participant may identify a procedure for restarting the graphics controller that is supported by the operating system of the IHS, or by an out-of-band embedded controller of the IHS.

In some embodiments, at 430, a participant 410 may obtain a handle that is supported by a remediation agent that is providing support for the participant, such as a process of the operating system, an embedded controller, or a remote management process. As described in additional detail below, the retrieved handle may be used to invoke remediation procedures that are supported by the remediation agent, such as a handle that may be used to invoke procedures for initiating a restart a framework component. In embodiments where a remediation policy will include a handle by which a remediation procedure supported by a remediation agent may be invoked, the remediation policy may also specify a remediation API provide by the remediation agent 405. For instance, the remediation API supported by a remediation agent 405 may specify various procedures for reinitialization of a framework resource, or for initiating various fail-over procedures.

Once a participant has obtained a remediation policy, which may include a handle provided by a remediation agent 405, at 435, such participants 410 may register with the platform framework 418 and may thus obtain support the error handling procedures described herein. In various embodiments, the registration request issued by a participant 410 may specify a platform framework resource that is made available by the participant 410, such as specifying a component or other sensor that is accessed by the participant 410, or such as specifying a capability such as user presence detection capability that is provided by the participant 410. In addition, the registration request may specify a remediation policy for use in invoking remediation procedures for error conditions related to the participant 410. As described, the remediation policy may also include a communications handle for invoking a remediation API supported by a remediation agent 405 providing support for the participant 410. In some embodiments, rather than specify a remediation policy in its registration with the platform framework 418, a participant 410 may specify a remediation policy upon confirmation of its successful registration with the platform framework 418.

As described above, hardware components of an IHS may be validated as authentic based on confirmation that instructions, such as firmware and/or drivers, utilized by the component are identical to a set of trusted reference instructions for the component, where such reference instructions may be provided during assembly of an IHS, or during a trusted administration of the IHS. In some embodiments, the participant 410 may validate the integrity of driver and/or firmware instructions utilized by a hardware resource that is operated via the participant 410. In some embodiments, the participant 410 may verify that the resource 405 operates using only instructions that have been verified as authentic against reference signatures provided by a trusted source, such as the embedded controller of the IHS of FIG. 1.

Once the instructions utilized by the hardware resource 405 have been validated by a participant 410, at block 320 of FIG. 3 and 435 of FIG. 4, the participant 410 registers with the platform framework 418. In some embodiments, such registrations may be supported by an API of the platform framework 420, such as described with regard to FIG. 2, where the API of the platform framework allows participants to register as a producers or provider that allows other participants to access a particular type of platform resource, and where the API of the platform framework allows participants to register as a consumer of platform framework resources. In some embodiments, the registration request issued by participant 410 identifies a platform resource that it provides access to, where the platform resource may be hardware component of the IHS or may be a service that itself is implemented using one or more platform framework resources.

In some embodiments, at 440, upon receiving a registration request from a participant, the platform framework core 420 may validate the participant 410 that has issued the registration request. As described, the integrity of hardware components of an IHS may be validated based on confirmation that instructions, such as firmware or drivers, utilized by the component are identical to a set of trusted reference instructions for the component. In some embodiments, the platform framework core 420 may verify that drivers and/or firmware utilized by a hardware component associated with a registering participant 410 has been validated in such a manner. In some embodiments, the platform framework core 420 may additionally or alternatively verify that the participant 410 operates using only instructions that have been verified as authentic against reference signatures provided by a trusted source, such as the embedded controller of the IHS of FIG. 1.

Based on the validation of participant 410, the platform framework core 420 registers the participant 410 as providing use of an underlying platform resource, such as a camera, or as providing a service that is provided based on one or more underlying resources, such as a user presence detection participant 410 that utilizes various different sensors and data streams in its user presence determinations. As described above, in the use of platform resources, a wide variety of error conditions may be reported by platform framework participants. Embodiments support error handling capabilities that may be implemented using a platform framework, where the error handling may be configured and adapted at runtime, and where error handling procedures may be specified through remediation policies that may be used to initiate remediation of a platform framework participant 410 that has entered an error condition.

As indicated in FIG. 4, in some embodiments, the platform framework core 420 may rely on an error management component 415 of the framework in order to manage various aspects of the error handling capabilities described herein. Accordingly, at 445 of FIG. 4 and at 330 of FIG. 3, the error manager 415 may map the registered participant 410 to the remediation policy that was provided in the participant's registration request, or that was provided in confirmation of a successful registration. In some embodiments, the error manager 415 may add the participant 410 to a manifest of registered participants, where the manifest identifies the participant 410 and the remediation polices that are being mapped to each participant. In some embodiments, the remediation policy provided in the participant's 410 registration may also specify one or more handles that may be used to initiate remediation procedures supported by a remediation agent 405.

In some embodiments, this remediation policy that is provided for use by the participant 410 may also specify a remediation API that is supported by the remediation agent 405, where the remediation API may be invoked using the handle of the remediation policy. The API provided by the participant 410 may be represented in the form of a structured file, such as a JSON or XML file, and may be mapped to the participant 410 along with the remediation policy and the accompanying communication handle that may be used to invoke the remediation API supported by the remediation agent 405. Once registration is completed and the mapping of remediation policies has been completed, the error manager 415 may issue a confirmation, at 450, of the successful registration. With the participant's 410 remediation polices registered within the manifest maintained by the platform framework error manager 415, various operations of the IHS may continue, which may include the registration of various other participants with the platform framework.

As part of these ongoing operations by the platform framework 418, as indicated at 452 of FIG. 4, these operations may include a registration by a participant that is a resource consumer 425. As above, at 455, the platform framework may validate the authenticity of the consumer 425 using a token provided in the consumer's registration requests. At 460, the platform framework 418 provides the registered consumer 425 with a listing of available resources, such as resources 405 mapped to registered participants 410 by the platform framework. At 465 of FIG.

4, the consumer 425 registers as a user of the resource that is operated via the registered participant 410.

Once the resource consumer 425 has been registered as a user of the resource made available by the participant 410, the consumer 425 may interoperate to various extents with the participant 410. As described above, various types of errors may be generated during operations by registered participants of a platform framework, such as use by consumer 425 of a platform resource made available via a participant 410. As indicated at 365 of FIG. 3, embodiments may initialize an error condition monitoring capability, such as an integrated error monitor of the platform framework core. The initiated error monitor may also detect errors issued by the operating system and by management components of the IHS, such as the embedded controller of FIG. 1.

Utilizing the error monitor, at 370 of FIG. 3 and at 470 of FIG. 4, an error condition is detected by an error management 415 capability of the platform framework 418, where the error condition may be detected based on error messages reported to the platform framework, or errors that are discovered through queries conducted by an error monitoring capability of the platform framework. A detected error condition may specify that a hardware resource, such as a camera, has become inoperable, or may specify that a participant, such as a provider of user presence detection capabilities is inoperable. In other instances, the operational status of a component, such as a network controller, may be queried in response to error messages reported by the network controller, or by framework participants attempting to invoke capabilities of the network controller. In some instances, the error condition may specify degraded operating capabilities of a participant, such as a time-of-flight sensor reporting limited capabilities resulting from interference in the physical environment in which the IHS is located.

In response to the detection of the error condition, at 475 of FIG. 4 and at 375 of FIG. 3, a participant that is the source of the error is identified by the error manage 415. In some instances, a participant 410 may be identified as the source of the errors based on the participant's reporting of the error. In other instances, a participant 410 may be inferred as the source of errors based on error messages being reported by other participants, such as consumer 425 attempting to utilize a user presence detection capability and that instead receives failure messages when attempting to invoke operations supported by the user presence detection participant. In some embodiments, a participant 410 may be identified as being a source of an error condition based on a combination of detected error messages and queries to the participant 410 or to a remote management resource.

In some embodiments, error conditions may be reports of resource conflicts reported by participants. For example, a participant 410 providing access to one or more display monitors coupled to an IHS may receive conflicting platform framework requests for transitioning the display monitors to a low-power mode, requests to initiate privacy capabilities supported by the displays and/or requests to change display resolution settings in use by the display monitors. In such embodiments, remediation polices for components utilizing the displays may specify remediation procedures for dealing with reports of such conflicts. Similar error conditions may be reported by a user presence detection provider that has received conflicting presence detection configurations, such as a request to fully identify individuals in proximity to the IHS and a request to only require motion detection for presence detection, thus forging attempts to more precisely identify individuals that are in proximity to the IHS. In such embodiments, remediation polices may specify remediation procedures for dealing with reports of such conflicts. The platform framework may implement remediation procedures that resolve such conflicts through a variety of manners, such by choosing the settings that maintain as much functionality as possible for the user, or such as by deferring to settings provided by trusted resources of the IHS, such as components validated within a hardware root of trust of the IHS, or such as retrying the request after some time delay.

In some embodiments, repeated reports of conflicts may be resolved by preventing further attempts to invoke available remediation procedures. For instance, in scenarios where a remediation policy of a participant 410 may specify instructions for resolving reports of conflicts that result from repeated attempts to configure a resource in conflict with a configuration by a higher priority component or in a manner that has been determined to be unauthorized by the requestor, A remediation policy may specify resolution of such conflicts by modifying the remediation API that is supported by the remediation agent. For example, a remediation API may provide capabilities for reverting a platform resource, such as a motion sensor, to utilization of a prior check-pointed version of its settings and instructions. However, in response to repeated errors resulting from attempts to reset a resource while it remains in use by another participant or by a participant with insufficient permissions, embodiments may modify the remediation API for the resource. For instance, such updates may remove the remediation API method by which the repeated reversion attempts were being initiated. The updated remediation API that removes this method is included in an updated remediation policy that is provided to the error handler 415 and that includes an updated handle used for invoking this updated remediation API. In this manner, the supported remediation procedures may be adapted at runtime in a variety of different ways.

As described above, registration of participant 410 with the platform framework 418 may include the participant 410 providing a remediation policy, which is mapped to this particular participant by the error manager 415 of the platform framework. At 480 of FIG. 4 and at 355 of FIG. 3, these mappings maintained by the error manager 415 are consulted in order to identify the remediation policies that were supplied by the participant 410 that has been identified as the source of the error condition. As described, a remediation policy that is mapped to a participant may specify various remediation procedures that may be invoked in response to error conditions related to the participant 410. For instance, in embodiments where the participant 410 provides user presence detection capabilities, the remediation policy provided by the participant may specify alternative presence detection sensors that may be utilized in response to an error message indicating a failure condition in a primary presence detection sensor utilized by the user presence detection participant 410. For example, such a remediation policy for a user presence detection participant 410 may specify that, in response to a detected failure or other unavailability of a time-of-flight sensor that is used as the primary presence detection sensor, user presence detection capabilities are to failover to use of a motion sensor or a Bluetooth sensor for detecting individuals in proximity to an IHS.

As indicated at 490 of FIG. 4, such fail-over remediation procedures may be implemented through operations of the platform framework 418. However, in some instances, a remediation policy specified by a participant 410 may support remediation procedures that are implemented by a remediation agent 405, where such remediation procedures may be invoked using a handle provided in the remediation policy. For example, in embodiments where a participant 410 provides access to graphics controller of an IHS, the remediation policy provided by the participant may specify a handle by which a remediation API supported by the operation system may be invoked to revert the graphics controller to a previously validated and checkpointed configuration. In such instances, the reversion remediation procedure supported by the operating system may be invoked in response to error messages indicating the graphics controller and/or participant 410 are unable to couple to an external monitor or to support certain monitor functions, such as touchscreen inputs.

As described, some remediation procedures may be initiated through invoking a remediation API supported by a remediation agent 405. For example, the ability to revert a hardware resource to use of a prior check-pointed configuration may be invoked through a remediation API supported by the remediation agent. As indicated at 485 of FIG. 4, in such embodiments, a handle provided in the remediation policy may be used to invoke a remediation API that is supported by the remediation agent 405 providing support for the participant 410. In some embodiments, the remediation agent 405 may be a local resource of the IHS, such as remediation capabilities of the operating system, or an embedded controller providing management capabilities, such as described with regard to FIG. 1, or the remediation agent 405 may be a remote agent, such as cloud resource providing remote support of an IHS that is member of an enterprise network that is supported by the cloud resource.

As described, this remediation API supported by a remediation agent 405 may be implemented by functions of the operating system that supports capabilities for initiating a reset of a hardware and/or software resource. In this same manner, the operation system may serve as remediation agent 405 that provides supported for a variety of additional remediation procedures, such as reverting a component to use of prior settings. In embodiments where the operating system is the remediation agent 405, a handle provided by the operating system may be a handle to an IPC (Inter-process Communication) that is supported by an operating system process that includes capabilities for initiating a reset, or other remediation procedures, for platform resources being utilized by a participant 410. In this same manner, an embedded controller, such as described with regard to FIG. 1, may implement certain management capabilities that include serving as a remediation agent 405 for certain platform resources and may also provide handles for invoking the remediation procedures it supports, where the handle may be an IPC that is supported by a secure execution environment operating on the embedded controller. According, in some embodiments, an embedded controller, such as described with regard to FIG. 1, may alternatively or additionally support such remediation API features for resetting a graphics controller and for resetting various other platform hardware resources, such as those described with regard to FIG. 1.

As described with regard to FIG. 1, IHSs may support containerized workspaces that provide computing environments that may operate in varying degrees of isolation from the underlying hardware of the IHS and from other workspaces. As described, the operation of such workspaces may be specified within a workspace definition that may be provided by a remote orchestration layer, where the workspace definition identifies the security restrictions and productivity tools for a particular workspace based on the security and productivity contexts of the hardware and software of an IHS, the user, the physical environment, the data being accessing, etc. In some embodiments, a workspace definition may specify instructions for directing the deployment of a workspace and may also specify platform framework resources that a workspace will rely upon, such as specifying that the workspace relies on user presence detection capabilities of the platform framework.

Accordingly, in some embodiments, a workspace may register with the platform framework 418 as participant 410 providing security context updates that are based on inputs from various other framework participants, such as a user presence detection provider. In such embodiments, a workspace definition corresponding to this workspace may specify a remediation policy for this particular participant 410, where this remediation policy may be submitted as port of the registration of the workspace as a participant 410, and where the remediation policy is then mapped to the workspace by the error handling function 415 of the platform framework 418. In some embodiments, the workspace definition for workspace participants 410 may include a handle in its provided remediation policy, where the handle is supported by a remediation function of the remote workspace orchestrator that deployed the workspace. In such embodiments, the handle may be used to invoke a remediation API that is supported by the remote workspace orchestrator remediation function, such as a remediation API that includes capabilities for re-initializing a workspace, or redeploying it to a remote resource.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of hardware devices, each operated by one or more registered participants of a platform framework;
a processor; and
a memory coupled to the processor, the memory having program instructions stored thereon that, upon execution, cause the platform framework of the IHS to:
receive a registration request from a registered participant providing operation of a first of the plurality of hardware devices, wherein the request specifies a remediation policy for addressing error conditions related to the registered participant;
map the remediation policy to the participant, wherein the remediation policy comprises one or more handles for invoking remediation procedures for the registered participant;
detect an error condition during operation of the platform framework;
determine the registered participant is a source of the error condition;
identify a remediation policy that has been mapped to the registered participant; and
utilize the one or more handles in the remediation policy to invoke remediation procedures for the registered participant.

2. The IHS of claim 1, wherein the handle comprises a communication resource supported by a remediation agent that provides support for the registered participant.

3. The IHS of claim 2, wherein the handle comprises an IPC (Inter-process Communication) supported by an operating system of the IHS.

4. The IHS of claim 2, wherein the handle comprises an IPC supported by an embedded controller of the IHS.

5. The IHS of claim 2, wherein the utilization of the one or more handles of the remediation policy invokes a remediation API supported by the remediation agent to restart the registered participant.

6. The IHS of claim 2, wherein the registered participant supports use of a camera of the IHS, and wherein the remediation procedures comprise a command for initiating re-initialization of the camera by the remediation agent.

7. The IHS of claim 6, wherein the remediation procedures further comprise instructions for use of an alternative image collection capability that is supported by the platform framework while the camera is unavailable.

8. The IHS of claim 2, wherein the registered participant supports use of a network controller of the IHS, and wherein the remediation procedures comprise instructions for use of an alternative network resource that is supported by the platform framework while the network controller is unavailable.

9. The IHS of claim 2, wherein the registered participant supports use of a graphics controller of the IHS, and wherein the remediation procedures comprise instructions for initiating a reset of the graphics controller.

10. The IHS of claim 2, wherein the registered participant supports use of a graphics controller of the IHS, and wherein the remediation procedures comprise instructions for reverting settings in use by the graphics controller.

11. The IHS of claim 2, wherein the error condition comprises a report of conflicting requests received by the registered participant.

12. The IHS of claim 11, wherein the remediation policy comprises instructions for updating a remediation API that is supported by the remediation agent.

13. The IHS of claim 1, wherein the registered participant comprises a containerized workspace and wherein the remediation agent comprises a remote workspace orchestrator that directs deployment of the workspace on the IHS.

14. The IHS of claim 13, wherein the remediation policy is comprised in a workspace definition by which the workspace orchestrator directs the deployment of the workspace on the IHS.

15. The IHS of claim 1, wherein the remediation policy comprises one or more fail-over procedures for adapting operations by the platform framework while the registered participant is unavailable.

16. The IHS of claim 1, wherein the registered participant provides user presence detection capabilities, and wherein the remediation procedures comprise instructions for use of an alternative sensor when the error condition indicates a primary sensor is unavailable.

17. A memory storage device having program instructions stored thereon that, upon execution by an Information Handling System (IHS) comprising a plurality of hardware devices, each operated by one or more registered participants of a platform framework, cause the IHS to:
receive a registration request from a registered participant providing operation of a first of the plurality of hardware devices, wherein the request specifies a remediation policy for addressing error conditions related to the participant;
map the remediation policy to the registered participant, wherein the remediation policy comprises one or more handles for invoking remediation procedures for the registered participant;
detect an error condition during operation of the platform framework
determine the registered participant is a source of the error condition;
identify a remediation policy that is mapped to the registered participant; and
utilize the one or more handles in the remediation policy to invoke remediation procedures for the registered participant.

18. The memory storage device of claim 17, wherein the handle comprises a communication resource supported by a remediation agent that provides support for the registered participant.

19. A method comprising:
   receiving a registration request from a participant of a platform framework, wherein the participant provides operation of a first of a plurality of hardware devices of an IHS (Information Handling System), and wherein the request specifies a remediation policy for addressing error conditions related to the participant;
   mapping the remediation policy to the participant, wherein the remediation policy comprises one or more handles for invoking remediation procedures for the participant;
   detecting an error condition during operation of the platform framework;
   determining the participant is a source of the error condition;
   identifying a remediation policy that is mapped to the participant; and
   utilizing the one or more handles in the remediation policy to invoke remediation procedures for the participant.

20. The method of claim 19, wherein the handle comprises a communication resource supported by a remediation agent that provides support for the participant.

* * * * *